S. C. SHAFFNER.
TOASTER.
APPLICATION FILED MAY 13, 1916.
1,221,228.
Patented Apr. 3, 1917.
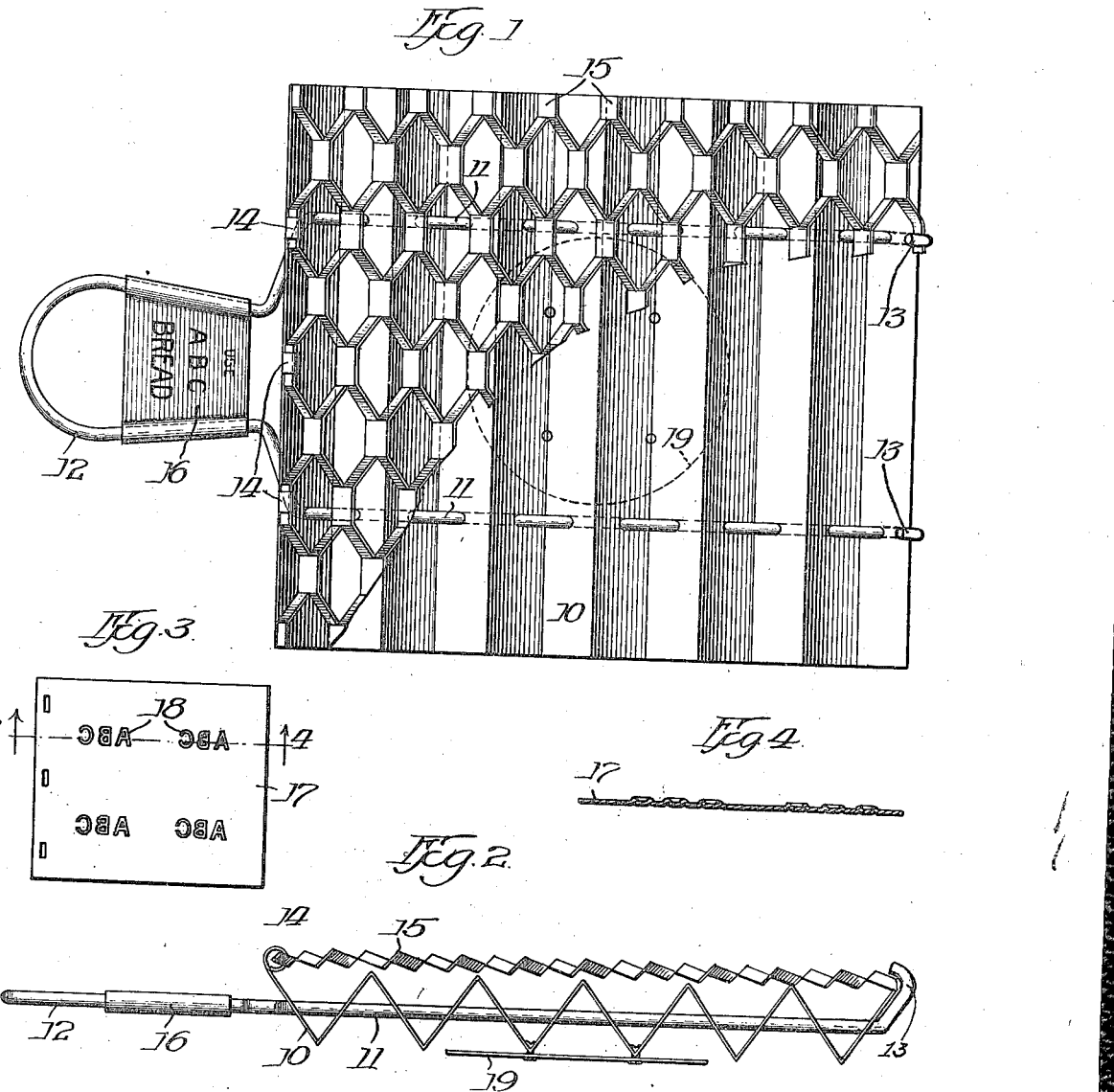
Witnesses:
Geo. C. Dixon
C. H. Roesner.
Inventor.
Samuel C. Shaffner
By Albert C. Bell
Atty.

UNITED STATES PATENT OFFICE.

SAMUEL C. SHAFFNER, OF CHICAGO, ILLINOIS.

TOASTER.

1,221,228.

Specification of Letters Patent.   Patented Apr. 3, 1917.

Application filed May 13, 1916.   Serial No. 97,217.

*To all whom it may concern:*

Be it known that I, SAMUEL C. SHAFFNER, a citizen of the United States, residing at Chicago, in the county of Cook and State of Illinois, have invented a certain new and useful Improvement in Toasters, of which the following is a specification.

My invention relates to an improved form of toaster for toasting bread, and is characterized by cheapness of construction, efficiency of operation and the readiness with which it may be adapted to advertising purposes.

My invention will be best understood by reference to the accompanying drawings in which—

Figure 1 shows in plan view my toaster with a part of the upper section removed, Fig. 2 shows the toaster in side elevation, Fig. 3 shows in plan view a modified construction of upper portion of the toaster, and Fig. 4 shows in sectional view taken along the line 4—4 the parts shown in Fig. 3.

Similar numerals refer to similar parts throughout the several views.

As shown in Figs. 1 and 2 the toaster consists of a sheet of corrugated metal 10 provided with perforations through its walls for receiving the rods 11 which serve to support the corrugated plate 10. These rods 11 are preferably formed from a single rod or wire so that the handle 12 is formed integrally with them between their left hand ends, the right hand ends of the rods being bent into hooks as indicated at 13 to hold the rods in place and keep the corrugated plate 10 and the sheet 15 in the position indicated.

The left hand edge of the plate 10 is preferably provided with upturning ears 14 forming hinges engaging the left hand edge of the top member of the toaster, which in the construction shown in Figs. 1 and 2 consists of a sheet of expanded metal 15 of sufficient thickness to prevent the bread from coming close enough to the plate 10 to be unevenly heated thereby. It is important that the perforations formed in the plate 10 should closely fit the rods 11 and that no other perforations should be made through the plate 10 since they would permit the gases from the fire coming directly in contact with the bread being toasted, and I find it desirable to prevent this on account of the gases frequently containing injurious substances.

The hinged connection of the top member 15 with the plate 10 permits it to be readily raised away from the plate 10 for cleaning purposes. The handle 12 may conveniently carry a plate of thin metal 16 upon which any desired advertisement may be printed or stamped, and this plate at the same time serves to reinforce the handle.

Instead of the corrugated iron shown in Figs. 1 and 2 as the upper member of the toaster, it will be apparent that other supporting grids may be employed of any desired kind providing the bread is kept a sufficient distance from the corrugated plate 10 to prevent uneven heating of the bread, the expanded metal being used principally because of its convenience and efficiency.

In the modified construction shown in Figs. 3 and 4, the top member of the toaster consists of a continuous sheet of metal 17 in which upwardly raised letters 18 are formed preferably in reversed condition so that the impression made by these letters upon the toasted bread will read in right relation, and these letters may be arranged in any desired form to constitute an advertisement as, for example, of the particular bread with which the toaster may be sold. The effect of these raised letters is of heating the bread to a greater degree at these points than at the surrounding points since the raised letters are directly in contact with the bread while there is a small air space immediately surrounding the letters between the bread and the plate 17. For toasters designed for toasting several slices of bread at the same time as is the case with the construction shown in the drawings, it is desirable to duplicate the raised letters for each slice so that the advertising matter may appear upon each slice of toast.

For some conditions of fire with which the toaster is used it is desirable to employ a spreader 19 below the plate 10 and this may readily be done by making the spreader circular in form as shown and attaching the same to the plate 10 by suitable rivets as indicated. For this construction the spreader serves to deflect the heat as, for example, where it comes from a single concentrated gas burner and equalize it over the entire lower surface of the toast. For more distributed burners the corrugations of the plate 10 will alone suffice to distribute the heat and, in connection with the separating upper member of the toaster, produces a uniform heating of the bread and in that way produces a uniform toasting effect over its whole surface.

While I have shown my invention in the particular embodiment herein disclosed, I do not, however, limit myself to these exact constructions as I may employ equivalents thereof without departing from my invention.

What I claim is:

1. In a toaster, the combination of a sheet of corrugated metal, reinforcing rods extending through the corrugations of said sheet and formed into a supporting handle and retaining ends for said sheet, a separating member hinged at one edge to the edge of said sheet for keeping the toast from engagement with said corrugated sheet, and a combined advertising and reinforcing plate carried by said handle, said corrugated sheet having no unclosed openings therethrough.

2. In a toaster, the combination of a sheet of corrugated metal, reinforcing rods extending through the corrugations of said sheet and formed into a supporting handle and retaining ends for said sheet, a separating member hinged at one edge to the edge of said sheet for keeping the toast from engagement with said corrugated sheet, a combined advertising and reinforcing plate carried by said handle, said corrugated sheet having no unclosed openings therethrough, and a spreader secured centrally to the under surface of said corrugated sheet.

3. In a toaster, the combination of a sheet of corrugated metal, reinforcing rods extending through the corrugations of said sheet and formed into a supporting handle and retaining ends for said sheet, a separating member hinged at one edge to the edge of said sheet for keeping the toast from engagement with said corrugated sheet, and a combined advertising and reinforcing plate carried by said handle, said corrugated sheet having no unclosed openings therethrough, said separating member consisting of a sheet of metal having letters raised therefrom to form a desired advertisement for similarly marking the toast.

4. In a toaster, the combination of a sheet of corrugated metal, reinforcing rods extending through the corrugations of said sheet and formed into a supporting handle and retaining ends for said sheet, a separating member hinged at one edge to the edge of said sheet for keeping the toast from engagement with said corrugated sheet, and a combined advertising and reinforcing plate carried by said handle, said corrugated sheet having no unclosed openings therethrough, the ends of said reinforcing rods being bent into hooks to hold the free edge of said separating member in place on said sheet.

5. In a toaster, the combination of a sheet of corrugated metal, reinforcing rods extending through the corrugations of said sheet and formed into a supporting handle and retaining ends for said sheet, a separating member hinged at one edge to the edge of said sheet for keeping the toast from engagement with said corrugated sheet, and a combined advertising and reinforcing plate carried by said handle, said corrugated sheet having no unclosed openings therethrough, the ends of said reinforcing rods being bent into hooks to hold the free edge of said separating member in place on said sheet, said hooks permitting the ready removal of the edge of said member from engagement therewith.

In witness whereof, I hereunto subscribe my name this 6th day of May A. D. 1916.

SAMUEL C. SHAFFNER.